US008419025B2

(12) United States Patent
Chen et al.

(10) Patent No.: US 8,419,025 B2
(45) Date of Patent: Apr. 16, 2013

(54) INFANT CARRIER APPARATUS

(75) Inventors: Xuhui Chen, Central Hong Kong (HK); Fang Ming Li, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 132 days.

(21) Appl. No.: 13/077,607

(22) Filed: Mar. 31, 2011

(65) Prior Publication Data

US 2011/0248477 A1 Oct. 13, 2011

(30) Foreign Application Priority Data

Apr. 7, 2010 (CN) .............................. 2010 0 144608

(51) Int. Cl.
*B62B 9/20* (2006.01)
(52) U.S. Cl.
USPC ..................... 280/47.36; 280/47.38; 280/647; 280/639; 280/47.371; 280/658
(58) Field of Classification Search .................... 280/29, 280/47.34, 47.36, 47.371, 47.38, 638, 639, 280/647, 650, 657, 658; 403/1, 43, 46, 52, 403/83, 84, 92, 102–104, 106, 108, 109.1–109.3, 403/109.6–109.8, 321, 322.1, 325–327
See application file for complete search history.

(56) References Cited

U.S. PATENT DOCUMENTS

| 4,660,850 | A | * | 4/1987 | Nakao et al. | 280/642 |
| 4,779,879 | A | * | 10/1988 | Kassai | 280/47.36 |
| 4,832,361 | A | * | 5/1989 | Nakao et al. | 280/642 |
| 5,056,805 | A | * | 10/1991 | Wang | 280/47.36 |
| 5,062,179 | A | * | 11/1991 | Huang | 16/436 |
| 5,257,799 | A | * | 11/1993 | Cone et al. | 280/642 |
| 5,513,864 | A | * | 5/1996 | Huang | 280/47.36 |
| 5,845,924 | A | * | 12/1998 | Huang | 280/642 |
| 6,073,945 | A | * | 6/2000 | Cheng | 280/47.36 |
| 6,102,432 | A | * | 8/2000 | Cheng | 280/642 |
| 6,503,018 | B2 | * | 1/2003 | Hou et al. | 403/97 |
| 6,508,605 | B1 | * | 1/2003 | Cheng | 403/83 |
| 6,629,801 | B2 | * | 10/2003 | Cheng | 403/101 |
| 6,893,031 | B2 | * | 5/2005 | Suzuki | 280/47.36 |
| 6,938,914 | B2 | * | 9/2005 | Kassai et al. | 280/642 |
| 7,021,650 | B2 | * | 4/2006 | Chen | 280/642 |
| 2007/0085304 | A1 | * | 4/2007 | Yeh | 280/642 |

(Continued)

FOREIGN PATENT DOCUMENTS

GB 2404691 A * 2/2005
JP 2005096590 A * 4/2005

*Primary Examiner* — J. Allen Shriver, II
*Assistant Examiner* — Steve Clemmons
(74) *Attorney, Agent, or Firm* — David I. Roche; Baker & McKenzie LLP

(57) ABSTRACT

An infant carrier apparatus comprises a support frame, a handle pivotally coupled with the support frame, and a safety lock. The support frame can include first and second frame portions pivotally coupled each other, whereby the first frame portion can rotate relative to the second frame portion between collapsed and deployed states. The handle can rotate relative to the support frame between two positions of opposite inclinations. The safety lock is assembled between the handle and the first frame portion, and is triggered by a rotational movement of the handle to lock the first and second frame portion. The safety lock is unlocked to allow relative rotation between the first and second frame portion when the handle is in the first position. The safety lock rotationally locks the first and second frame portion when the handle is in the second position.

19 Claims, 13 Drawing Sheets

U.S. PATENT DOCUMENTS

| | | | |
|---|---|---|---|
| 2007/0132207 A1* | 6/2007 | Moriguchi et al. | 280/642 |
| 2008/0073879 A1* | 3/2008 | Chen et al. | 280/642 |
| 2008/0088116 A1* | 4/2008 | Den Boer | 280/650 |
| 2009/0033066 A1* | 2/2009 | Saville et al. | 280/650 |
| 2010/0156060 A1* | 6/2010 | Dotsey et al. | 280/47.371 |
| 2010/0244408 A1* | 9/2010 | Dean et al. | 280/647 |
| 2012/0025492 A1* | 2/2012 | Grintz et al. | 280/647 |

* cited by examiner

INFANT CARRIER APPARATUS

CROSS-REFERENCE TO RELATED APPLICATION(S)

This application claims priority to China Patent Application No. 201010144608.3, which was filed on Apr. 7, 2010.

BACKGROUND

1. Field of the Invention

The present invention relates to infant carrier apparatuses, and more particularly to a collapsible infant carrier apparatus that has an adjustable handle.

2. Description of the Related Art

A stroller apparatus typically comprises a support frame provided with wheels, a seat assembly, a folding mechanism and a handle. After a child is placed in the seat, the parent can use the handle to push the stroller in movement. In traditional strollers, the seat assembly is usually oriented toward the front of the stroller in its direction of displacement. Because the child does not face the parent when seated in the stroller, no interaction is permitted between the child and the parent. To remedy this deficiency, some current approaches propose a stroller structure in which the orientation of the handle or backrest can be adjusted back and forth, whereby the child can also be seated facing the parent. However, the presence of the adjustable handle may interfere with the collapse process of the stroller frame, and requires to make sure that the handle is set in a proper position before the stroller is collapsed. In case it is not at the proper position, the handle may collide against the ground or other moving parts as the stroller frame is folding, which results in the failure to completely collapse the stroller. Because the folding operation becomes more complex, erroneous operation from the user may occur.

Therefore, there is a need for an infant carrier apparatus that can prevent erroneous folding operation and address at least the foregoing issues.

SUMMARY

The present application describes an infant carrier apparatus that can prevent erroneous folding operation and is safer in use.

In one embodiment, the infant carrier apparatus comprises a support frame, a handle pivotally coupled with the support frame, and a safety lock. The support frame can have opposite first and second sides, and include a first frame portion, and a second frame portion pivotally coupled with the first frame portion, whereby the second frame portion is operable to rotate relative to the first frame portion between a collapsed state and a deployed state. The handle is operable to rotate relative to the support frame between a first position inclined toward the second side, and a second position inclined toward the first side of the support frame. The safety lock is assembled between the handle and the first frame portion, and is triggered by a rotational movement of the first frame portion to rotationally lock the first frame portion with the second frame portion. As the handle is rotated to the first position, the safety lock is turned to an unlocked state to allow relative rotation between the first and second frame portion. As the handle is rotated to the second position, the safety lock is reversely turned to a locked state to lock in place the first and second frame portion and block relative rotation there between.

At least one advantage of the infant carrier apparatus described herein is the ability to block the support frame in the deployed state and disable its collapsing, when the handle is used at a certain inclined position that can interfere with the folding of the support frame. Accordingly, erroneous operation from a user can be prevented, and the infant carrier apparatus can be safer in use.

DETAILED DESCRIPTION OF THE EMBODIMENTS

Figure 1:
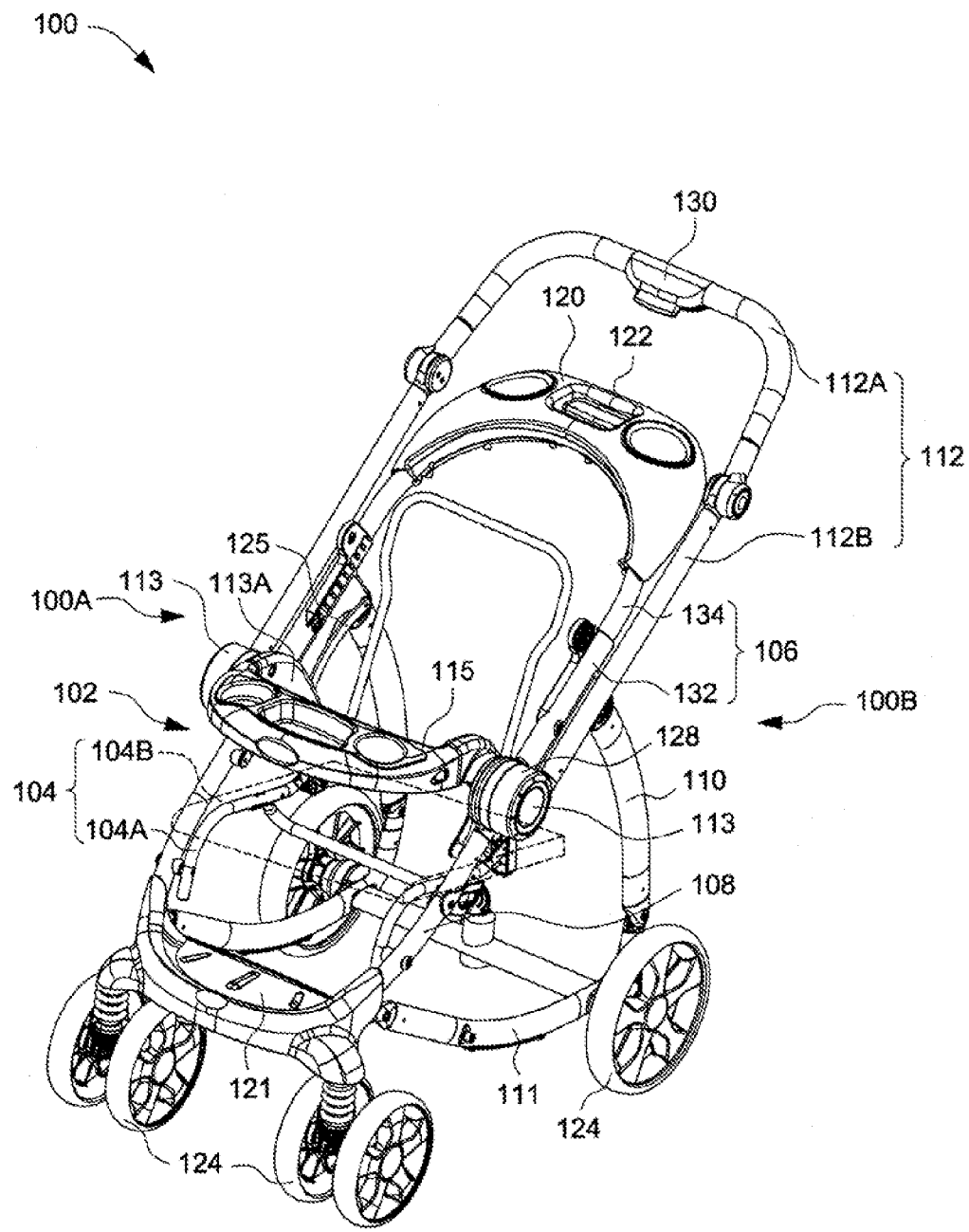
FIG. 1 is a schematic view illustrating an embodiment of an infant carrier apparatus.

FIG. 1 is a schematic view illustrating an embodiment of an infant carrier apparatus 100. The infant carrier apparatus 100 can be exemplary an infant stroller, comprising a support frame 102, a seat portion 104, and a handle 112. The support frame 102 can include a first frame portion 106 (for example, a link frame portion), a second frame portion 108 (for example, a front leg frame), a third frame portion 110 (for example, a rear leg frame), and linking base 111 connecting with the second frame portion 108 and third frame portion 110.

In the illustrated embodiment, the first and second frame portions 106 and 108 and the handle 112 can be respectively formed as U-shaped tubular frames, each including left and right side segments and a transversal segment coupled between the left and right side segments. The third frame portion 110 can include two elongated tube segments assembled on the left and right sides of the support frame 102. Each of the two elongated tube segments of the third body 110 can have a first or upper end pivotally connected with one side segment of the U-shaped first frame portion 106, and a second or lower end pivotally connected with the base 111.

On a same side (i.e., left and right side), the respective side segments of the first frame portion 106, second frame portion 108 and handle 112 are pivotally coupled together via a hinge assembly 113. In this manner, the handle 112 can be adjusted forward and rearward relative to the support frame 102. Moreover, the handle 112 and the first frame portion 106 can be folded and unfolded relative to the second frame portion 108 to collapse and deploy the support frame 102. As better shown in FIG. 4, each of the two hinge assemblies 113 can include first and second lock mechanisms 114 and 116. The first lock mechanism 114 can be operable to controllably lock the second frame portion 108 with the first frame portion 106, whereas the second lock mechanism 116 can be operable to controllably lock the handle 112 with the first frame portion 106. More details of the first and second lock mechanisms 114 and 116 will be described hereafter with reference to FIG. 4.

Referring again to FIG. 1, the infant carrier apparatus 100 can also comprise a front tray 115 and a rear tray 120. The front tray 115 can be pivotally assembled via a holding member 113A with the support frame 102 or seat portion 104. In the illustrated embodiment, the front tray 115 is exemplary shown as being coupled with the seat frame 104A. In turn, the rear tray 120 can be affixed with the first frame portion 106.

As shown, the transversal segment of the U-shaped second frame portion 108 can include a footrest board 121 for convenient placement of the child's feet. A plurality of wheels 124 are mounted with the lower ends of the second and third frame portions 108 and 110, so that the infant carrier apparatus 100 can desirably move toward a first side 100A (for example front side) or opposite second side 100B (for example rear side).

The seat portion 104 is assembled at a position between the left and right side frame boundaries of the support frame 102. The seat portion 104 can include a seat frame 104A, and a seat cushion 104B (shown with phantom lines) disposed on the seat frame 104A. However, other configurations of the seat portion 104 are possible, such as using a seat board as the seat portion 104, or providing a seat frame wrapped with a fabric. The seat frame 104A can have a front end pivotally connected with the second frame portion 108, and a rear end connected with the first frame portion 106 via hang bars 125.

As shown in FIG. 1, the handle 112 can be formed by a single or multiple tube segments assembled together. The handle 112 can have a generally U-shape including a transversal grasping portion 112A, and two (i.e., left and right) generally parallel side segments 112B having upper ends respectively joined with left and right opposite ends of the grasping portion 112A. Each of the side segments 112B also has a lower end connected with a first coupling element 128 of one hinge assembly 113 through which the handle 112 can be pivotally connected with the support frame 102. The grasping portion 112A can also include a handle adjustment control 130 that is connected with the two hinge assemblies 113. The handle adjustment control 130 can be operable to switch the second lock mechanisms 116 to an unlocked state for permitting rotation and adjustment of the handle 112.

In the illustrated embodiment, the first frame portion 106 can include two coupling brackets 132 and a tubular element 134. The tubular element 134 can have a generally U-shape including a transversal segment provided with the rear tray 120 and a folding control 122, and two (i.e., left and right) side segments respectively affixed with the coupling brackets 132. The seat frame 104A can have left and right rear sides respectively connected with the coupling brackets 132 via hang bars 125.

Figure 2:
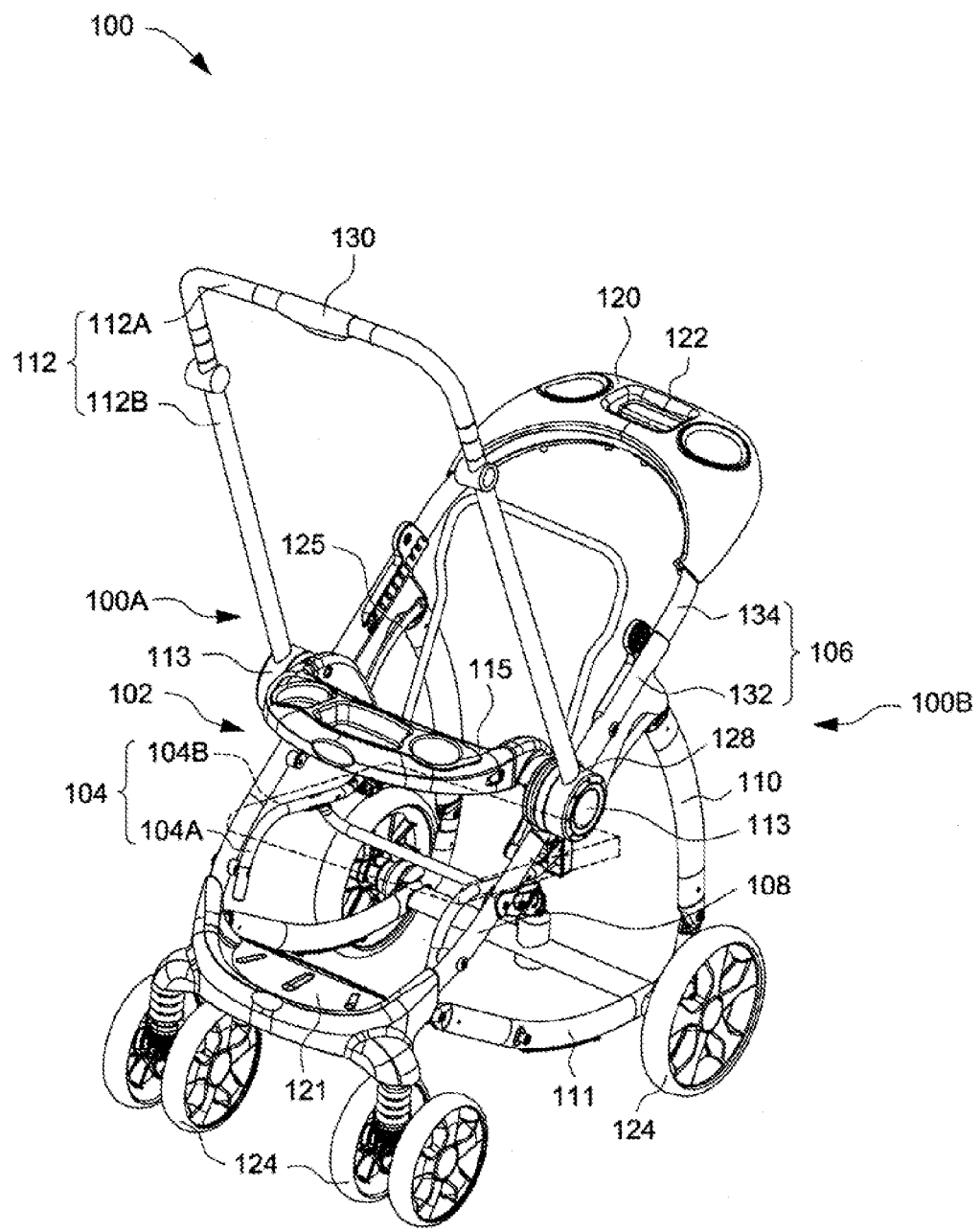
FIG. 2 is a schematic view illustrating an adjusted configuration of the infant carrier apparatus shown in FIG. 1.

FIG. 2 is a schematic view illustrating an adjusted configuration of the infant carrier apparatus 100. As shown in FIGS. 1 and 2, a caregiver can operate the handle adjustment control 130 to release the locking engagement applied by the second lock mechanisms 116 between the handle 112 and the support frame 102. Once unlocked, the handle 112 can be pivoted relative to the support frame 102 about a pivot axis defined by the hinge assemblies 113 for adjustment toward the second side 100B (as shown in FIG. 1), or the first side 100A (as shown in FIG. 2) of the infant carrier apparatus 100. Once the handle 112 is at the desired inclination, the second lock mechanisms 116 can act to lock the handle 112 in position relative to the support frame 102. Depending on the inclination of the handle 112, the caregiver can accordingly use the handle 112 to push the infant carrier apparatus 100 in movement toward the first side 100A or second side 100B.

Figure 3:
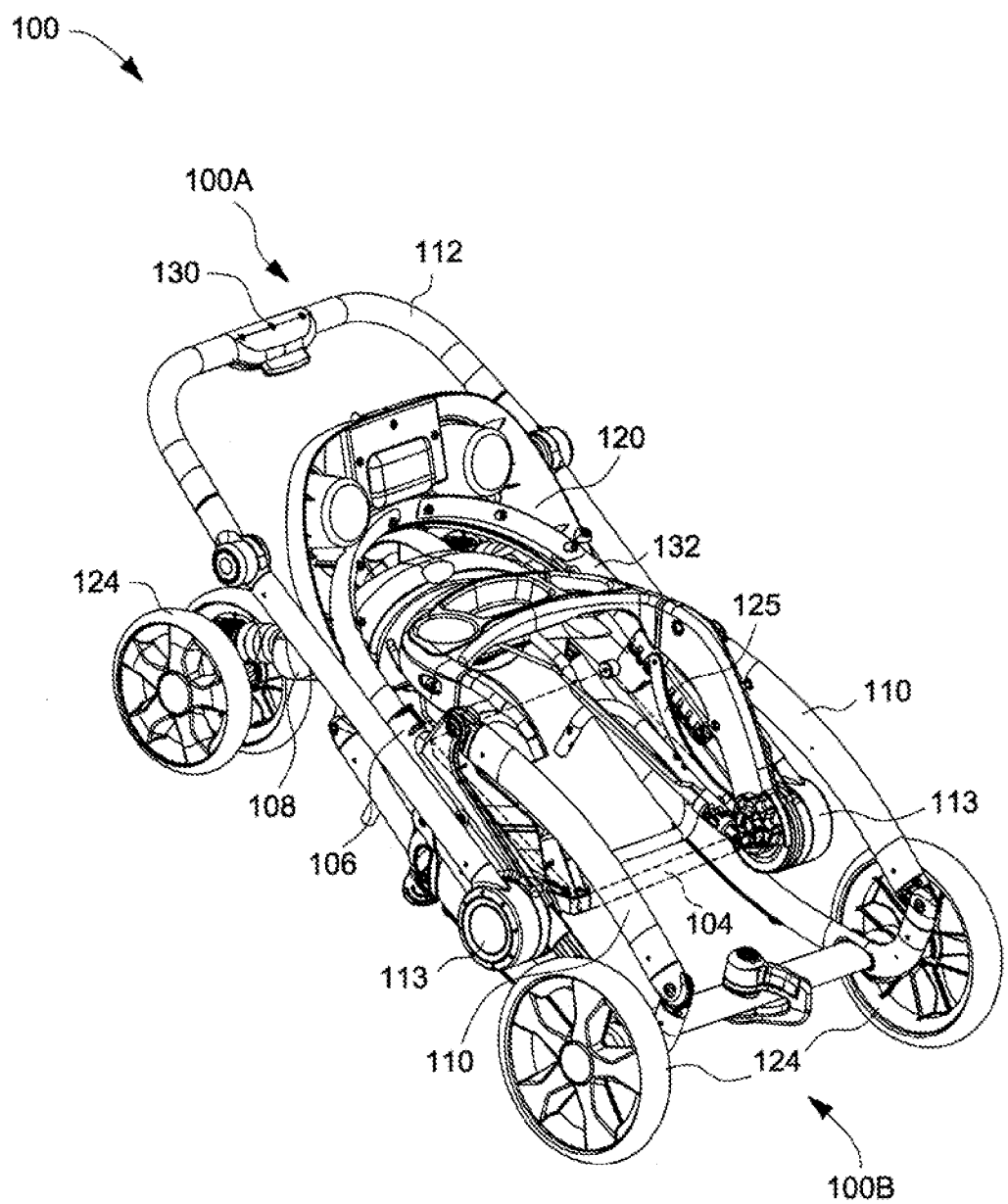
FIG. 3 is a schematic view illustrating the infant carrier apparatus of FIG. 1 in a collapsed state.

FIG. 3 is a schematic view illustrating the infant carrier apparatus 100 in a collapsed configuration. While the handle 112 is in a position inclined rearward, the folding control 122 can be operated to release the locking engagement applied by the first lock mechanisms 114 between the first and second frame portions 106 and 108. Then, the first frame portion 106 and the handle 112 can be adjustably pivoted together toward the first side 100A so as to fold the infant carrier apparatus 100 into the collapsed configuration, as shown in FIG. 3.

It is noted that the forward inclined position of the handle 112 (as shown in FIG. 2) can block movement of the support frame 102 in the direction to collapse the infant carrier apparatus 100. To prevent erroneous folding operation while the handle 112 is inclined forward, one or two of the hinge assemblies 113 can be provided with a safety lock 118 (better shown in FIG. 4) that can be triggered by a rotational movement of the handle 112 to rotationally lock the first and second frame portions 106 and 108, thereby preventing the first frame portion 106 from improperly folding and collapsing relative to the second frame portion 108.

Figure 4:
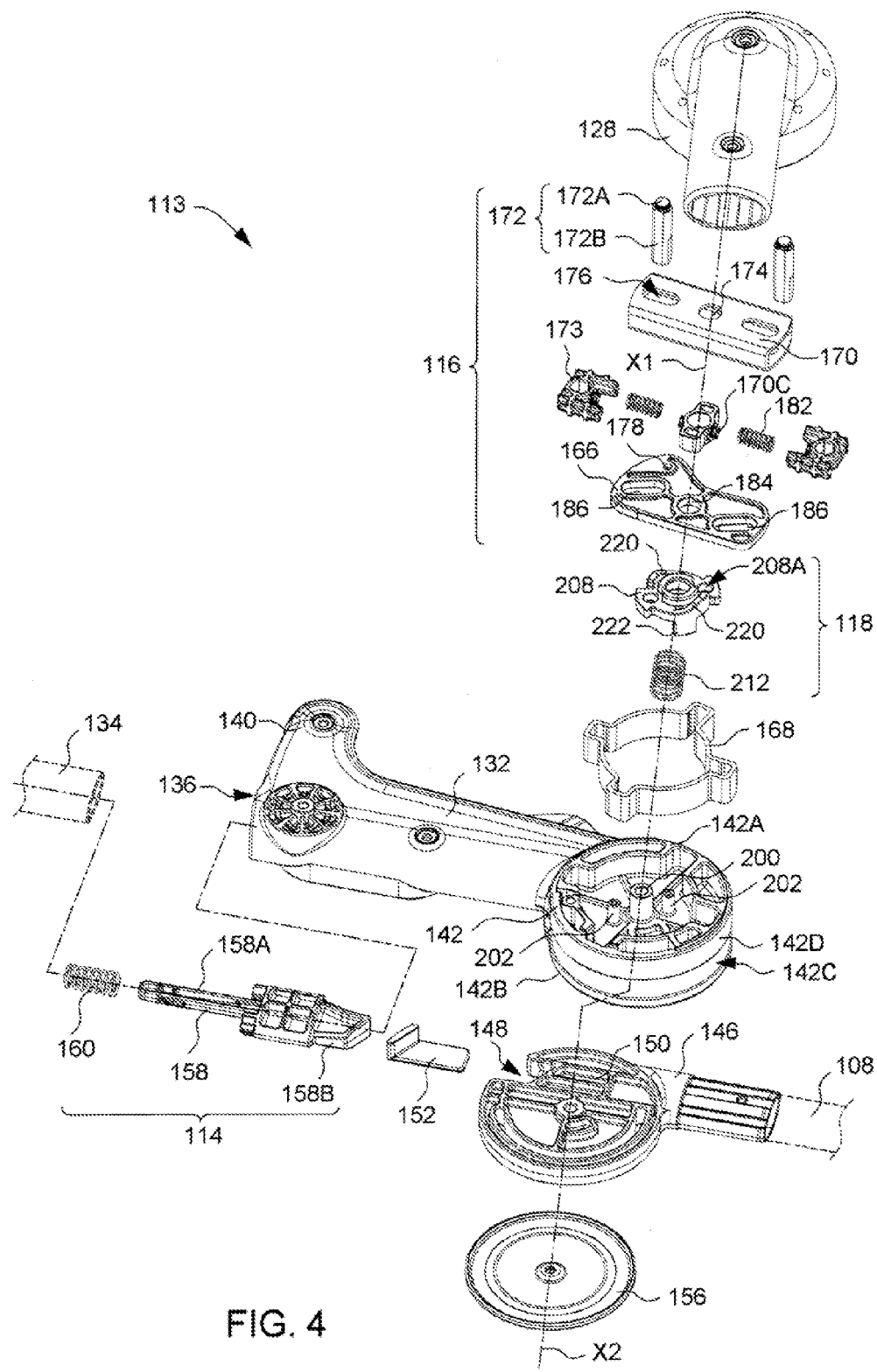
FIG. 4 is an exploded view illustrating the construction of a hinge assembly used in the infant carrier apparatus shown in FIG. 1.
Figure 5:
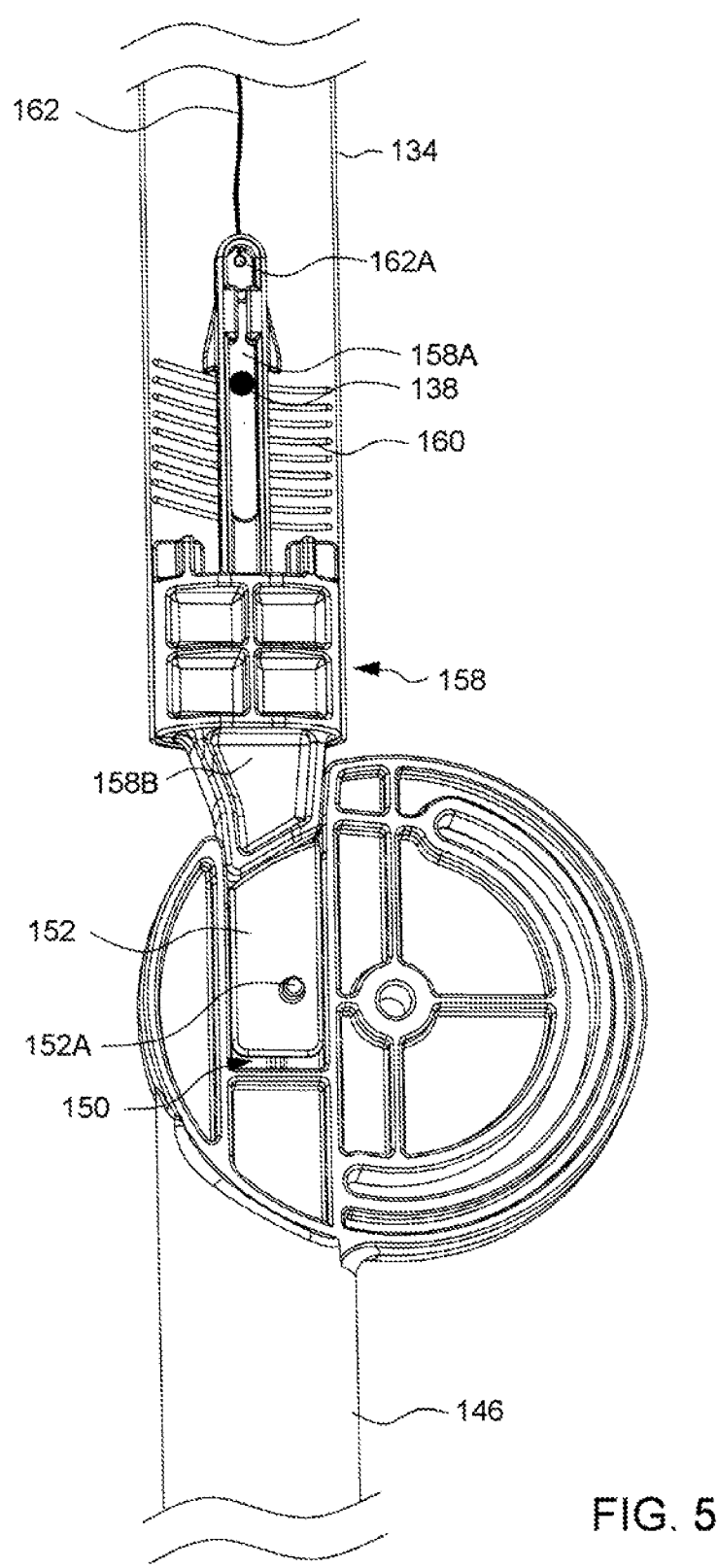
FIG. 5 is a schematic view illustrating the assembly of a portion of a first lock mechanism at one side of a tubular element in the support frame of the infant carrier apparatus shown in FIG. 1.

FIG. 4 is an exploded view illustrating the construction of one hinge assembly 113, whereas FIG. 5 is a schematic view illustrating the assembly of a portion of the first lock mechanism 114 on one side of the tubular element 134. While the construction of the hinge assembly 113 and first lock mechanism 114 is shown with respect to one side, it will be appreciated that the same structure may be provided at the other side of the support frame. As shown in FIGS. 4 and 5, the first lock mechanism 114 is assembled between the first frame portion 106 and the second frame portion 108, while the second lock mechanism 116 and the safety lock 118 are assembled between the first frame portion 106 and the handle 112. While the illustrated embodiment intends to incorporate a complete set of the first and second lock mechanisms 114 and 116 and the safety lock 118 at both the left and right sides, it is worth noting that alternate embodiments may also provide a complete set of the first and second lock mechanisms 114 and 116 and the safety lock 118 at only one side, no safety lock 118 being provided on the other side.

With respect to the construction of the first lock mechanism 114, the tubular element 134 can be inserted through an opening 136 of the coupling bracket 132 and securely affixed therewith. The first lock mechanism 114 is mounted through the interior of the tubular element 134. A fastener 138 may be engaged through the tubular element 134 and the coupling bracket 132 to fix the coupling bracket 132 with the tubular element 134. One side of the coupling bracket 132 can be provided with an ear-like extension 140 at which the third frame portion 110 can be pivotally connected with the coupling bracket 132. At a side opposite the extension 140, the coupling bracket 132 can include an axle housing 142 configured to respectively assemble with the first coupling element 128 affixed at the side of the handle 112, and a second coupling element 146 affixed at the side of the second frame portion 108.

As shown, the axle housing 142 can have a generally cylindrical shape including two opposite first and second surfaces 142A and 142B corresponding to two bases of a cylindrical shape, a cylindrical surface 142D delimited between the first and second surfaces 142A and 142B, and a slot 142C cut through the cylindrical surface 142D and communicating with the opening 136.

Figure 7:
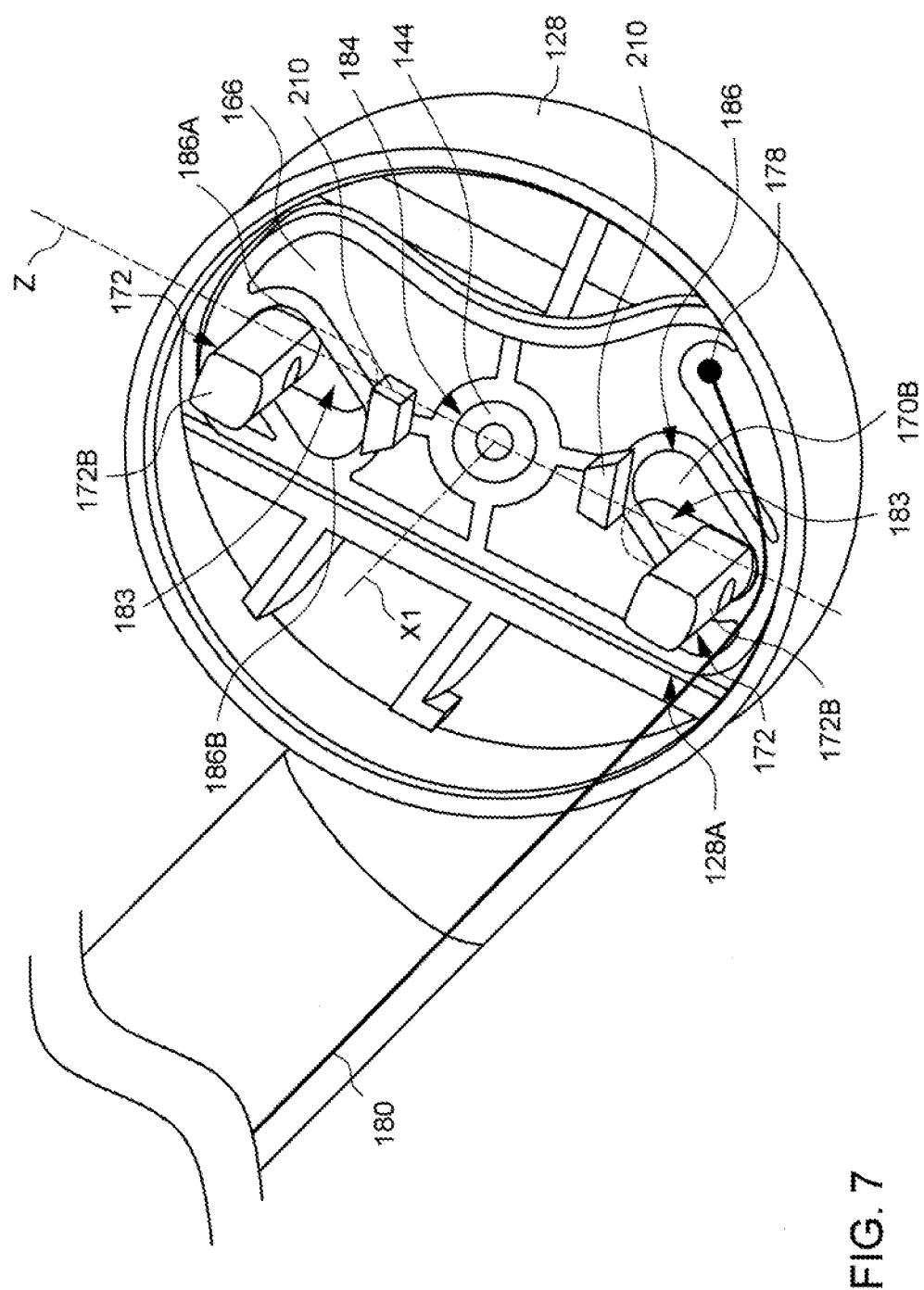
FIG. 7 is a schematic view illustrating a portion of the second lock mechanism including the assembly of a rotary plate and latch unit at the side of the handle.

The first coupling element 128 can be pivotally connected on the side of the first surface 142A of the axle housing 142, and can be rotationally locked with the axle housing 142 via the second lock mechanism 116. As shown in FIG. 7, in one embodiment, the first coupling element 128 can be formed as a shell having an inner side provided with a protruding shaft portion 144. The shaft portion 144 can pivotally assemble with a mating structure provided in the axle housing 142 to define a pivot axis X1 about which the handle 112 can be adjustably pivoted relative to the first frame portion 106.

The second coupling element 146 can be affixed with one side segment of the second frame portion 108, more specifically at a distal end thereof. The second coupling element 146 can have a disc-shape that matches with the cylindrical shape of the axle housing 142, including a major side surface provided with a guide track 150, and an outer peripheral edge provided with a notch 148 extending in a radial direction. While the second coupling element 146 is illustrated as a separate part affixed with the side segment of the second frame portion 108, it is understood that alternate embodiments may also have the second coupling element 146 integrally formed with the side segment of the second frame portion 108. A shutter 152 can be mounted for translational movement along the guide track 150 to selectively close or expose the notch 148.

Referring to FIG. 4, the second coupling element 146 can be inserted through the slot 142C of the axle housing 142, and be pivotally coupled with the coupling bracket 132 about a pivot axis X2. In this manner, the second frame portion 108 can be adjustably pivoted relative to the first frame portion 106. While the illustrated embodiment intends to arrange the pivot axes X1 and X2 in alignment with each other (i.e., they form a same axis), alternate embodiments may also offset the pivot axis X2 from the pivot axis X1 such that they extend in parallel direction, but are misaligned from each other.

When the second coupling element 146 and the coupling bracket 132 are assembled together, a protrusion 152A formed on a side of the shutter 152 can be movably engaged through a curved guide slit (not shown) formed on the second surface 142B of the axle housing 142. For preventing interference with the movement of the shutter 152, a lid 156 can cover the second surface 142B and the guide slit through which the protrusion 152A is engaged. When the first frame portion 106 rotates relative to the second frame portion 108 about the pivot axis X2 in a direction to collapse the support frame 102, the interaction between the protrusion 152A and the guide slit of the axle housing 142 can drive the shutter 152 to slide in a direction to occlude the notch 148. Accordingly, the shutter 152 can prevent the occurrence of finger pinching and jamming at the notch 148. When the first frame portion 106 rotates about the pivot axis X2 in a direction to unfold the support frame 102, the interaction between the protrusion 152A and the guide slit of the axle housing 142 can drive the shutter 152 to slide in an opposite direction to expose the notch 148.

In FIG. 5, the representation of the coupling bracket 132 is omitted to more clearly show the relationship between the first lock mechanism 114 and the second frame portion 108. The first lock mechanism 114 can include a latching arm 158 having an elongated shape, and a spring 160. The latching arm 158 can include an elongated slot 158A, and terminate into a tip 158B. When the latching arm 158 is movably installed through the tubular element 134, the fastener 138 can engage through the slot 158A so as to restrain the range of movement of the latching arm 158.

To drive movements of the latching arm 158, the spring 160 can have a first end connected with the fastener 138, and a second end connected with the latching arm 158. Moreover, the latching arm 158 can be connected with the folding control 122 via a transmission cable 162, a first end 162A of the transmission cable 162 being anchored with the latching arm 158, and a second end of the transmission cable 162 being connected with the folding control 122. A user can thereby operate the folding control 122 to switch the first lock mechanism 114 to an unlocked state. When the first lock mechanism 114 is turned to a locked state, the shutter 152 is biased away from the notch 148. Meanwhile, the tip 158B of the latching arm 158 can extend from the tubular element 134 to engage with the exposed notch 148 on the side of the second coupling element 146. Accordingly, the first and second frame portions 106 and 108 can be locked with each other.

Figure 6:
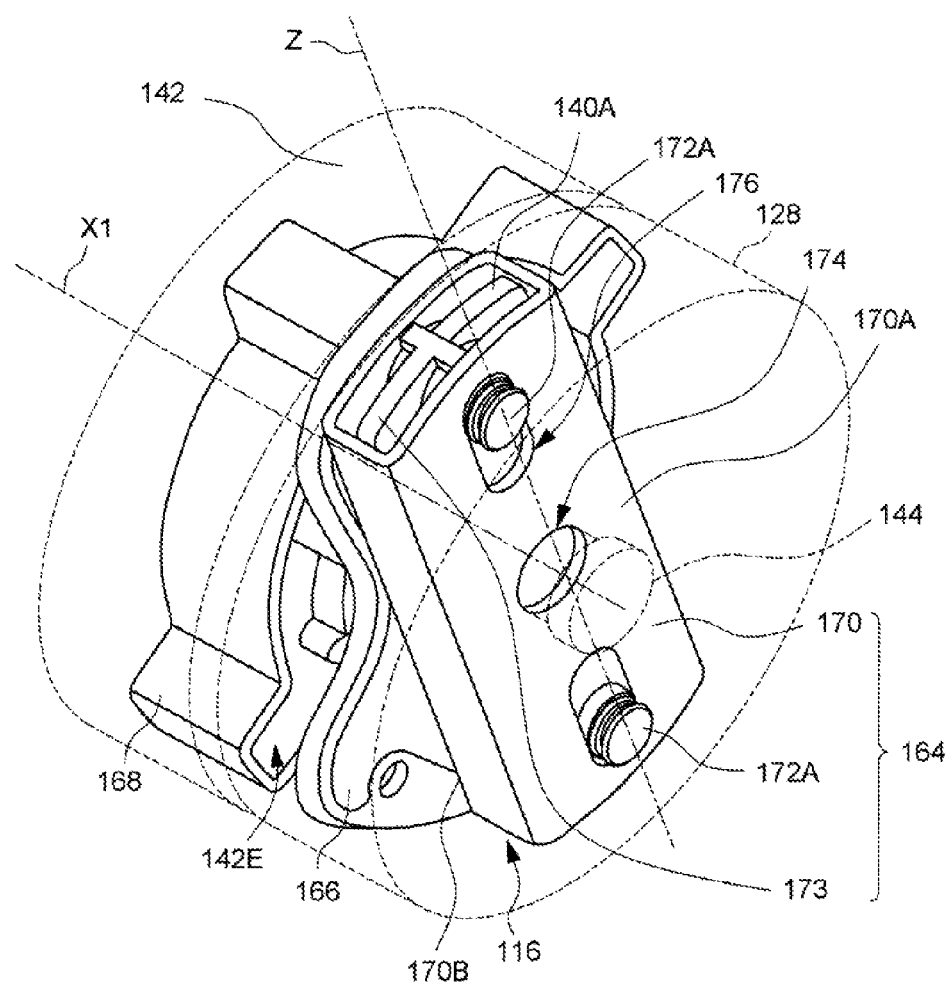
FIG. 6 is a schematic view illustrating the assembly of a second lock mechanism for achieving selective locking engagement between a handle and a first frame portion in the infant carrier apparatus shown in FIG. 1.

FIG. 6 is a schematic view illustrating the assembly of the second lock mechanism 116 for achieving selective locking engagement between the handle 112 and the first frame portion 106. For better showing the construction of the second lock mechanism 116, the first coupling element 128 and the axle housing 142 are shown with phantom lines. Referring to FIGS. 4 and 6, the second lock mechanism 116 can comprise a latch unit 164, and a rotary plate 166 adapted to drive movements of the latch unit 164. The latch unit 164 and the rotary plate 166 can be respectively assembled in the first coupling element 128. The axle housing 142 also includes an inner recessed region 142E facing the rotary plate 166. The inner recessed region 142E can be mounted with a rigid cage 168 that is provided with a plurality of radial locking grooves (better shown in FIG. 11 as reference numbers 204A, 204B, 206A and 206B).

The latch unit 164 can include a casing 170, and two latching bolts 172 movably assembled in the casing 170 for movement relative to the first coupling element 128. The casing 170 has a first surface 170A facing the first coupling element 128, and an opposite second surface 170B oriented toward the axle housing 142 and facing rotary plate 166. For facilitating the assembly of the latching bolts 172, each of the latching bolts 172 may be securely held on a mount seat 173 movably assembled in the casing 170. The first surface 170A includes a hole 174, and two elongated slots 176 located at two opposite sides of the hole 174 and extending along a same linear direction. An inner surface of the first coupling element 128 can include a protruding shaft portion 144 (shown with phantom lines) that can pass through the hole 174 to define the pivot axis X1. When the latching bolts 172 are assembled with the casing 170, two end portions 172A of the latching bolts 172 respectively pass through the two elongated slots 176. As the rotary plate 166 rotates, the movable engagement of the end portions 172A through the elongated slots 176 can guide and drive the latching bolts 172 in translational movements parallel to the axis Z of the elongated slots 176 and in opposite radial directions relative to the pivot axis X1.

Figure 8:
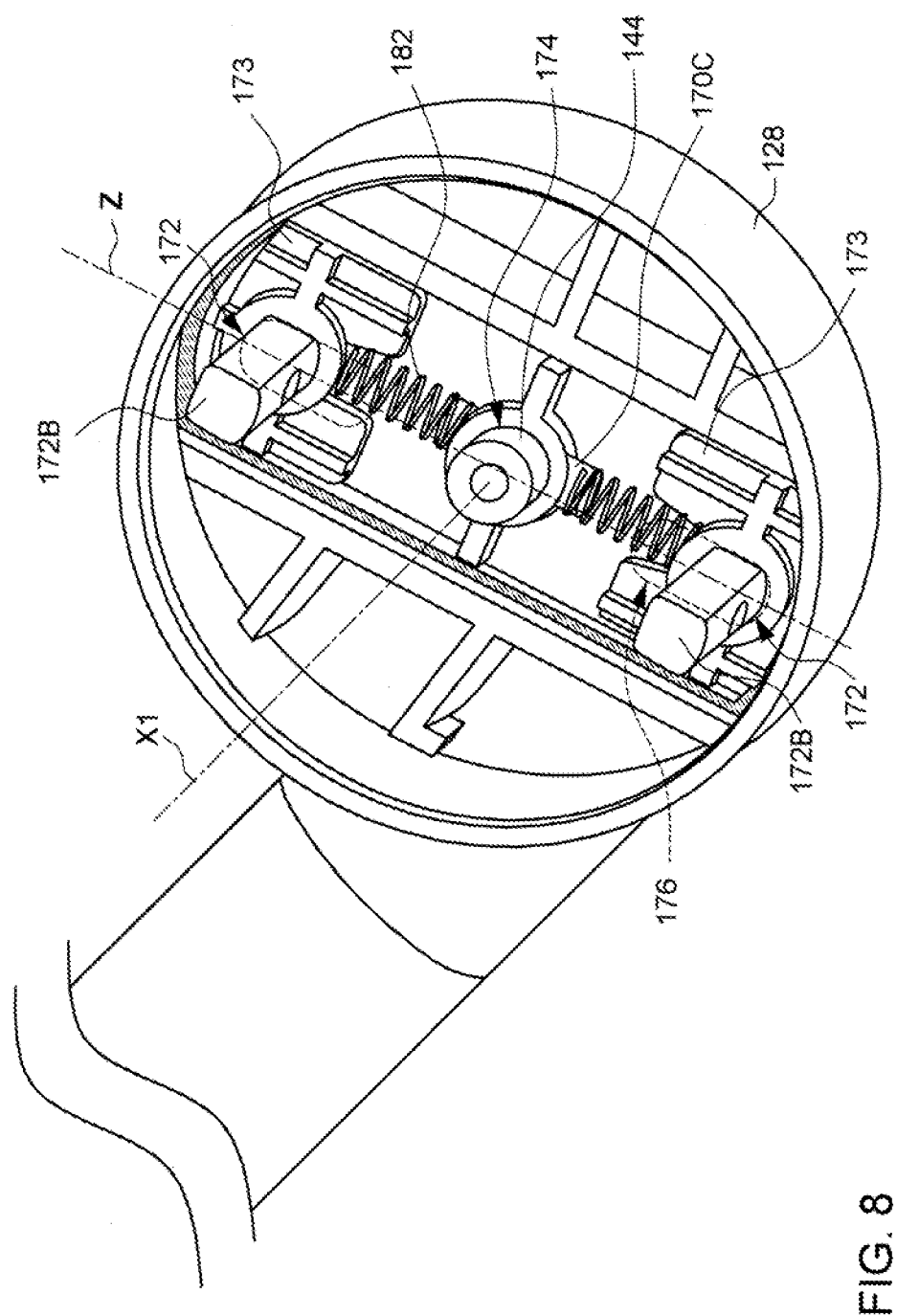
FIG. 8 is a schematic view illustrating latching bolts of the latch unit shown in FIG. 7.

FIG. 7 is a schematic view illustrating the assembly of the rotary plate 166 and latch unit 164 on the side of the handle 112. FIG. 8 is a schematic view illustrating the latching bolts 172 assembled with the casing 170. For more clearly showing the latching bolts 172, the representation of the second surface 170B of the casing 170 is omitted in FIG. 8. Referring to FIGS. 6, 7 and 8, the rotary plate 166 can be rotated about the pivot axis X1, and has an anchor hole 178 at an eccentric position relative to the pivot axis X1 at which a distal end of the transmission element 180 is affixed. The latching bolts 172 are placed on the axis Z at two opposite positions relative to the hole 174, respectively engaged in a movable manner through the elongated slots 176. The latching bolts 172 can thereby move in opposite radial directions relative to the pivot axis X1.

In addition, the latch unit 164 also includes springs 182 that are arranged in the casing 170 respectively between the hole 174 and each of the latching bolts 172. More specifically, each of the springs 182 can have a first end connected with one associated latching bolt 172 or mount seat 173, and a second end connected with an anchor stud 170C formed in the casing 170 proximate to a rim of the hole 174. The latching bolts 172 and springs 182 can thereby moves along the axis Z. For better guiding movements of the latching bolts 172, end portions 172B of the latching bolts 172 opposite to the end portions 172A can be movably guided through respective elongated slots 183 formed through the second surface 170B of the casing 170.

The casing 170 and the latching bolts 172 assembled therewith is positioned in an inner cavity 128A of the first coupling element 128. The shaft portion 144 can pass through the hole 174 and extend outward from the second surface 170B of the casing 170.

The rotary plate 166 can include a central hole 184, and two elongated guide slots 186 symmetrically located two opposite sides of the central hole 184. Each of the guide slots 186 can have first and second distal ends 186A and 186B. The guide slots 186 are parallel to each other and aligned along a same linear direction tilted an angle relative to the axis Z, such that the distance from the pivot axis X1 to the first distal end 186A of a guide slot 186 is greater than the distance from the pivot axis X1 to the second distal end 186B of the same guide slot 186. When the rotary plate 166 is assembled on the second surface 170B of the casing 170, the shaft portion 144 can pass through the central hole 184 whereas the end portions 172B of the latching bolts 172 are movably guided through the guide slots 186, respectively.

Figure 9:
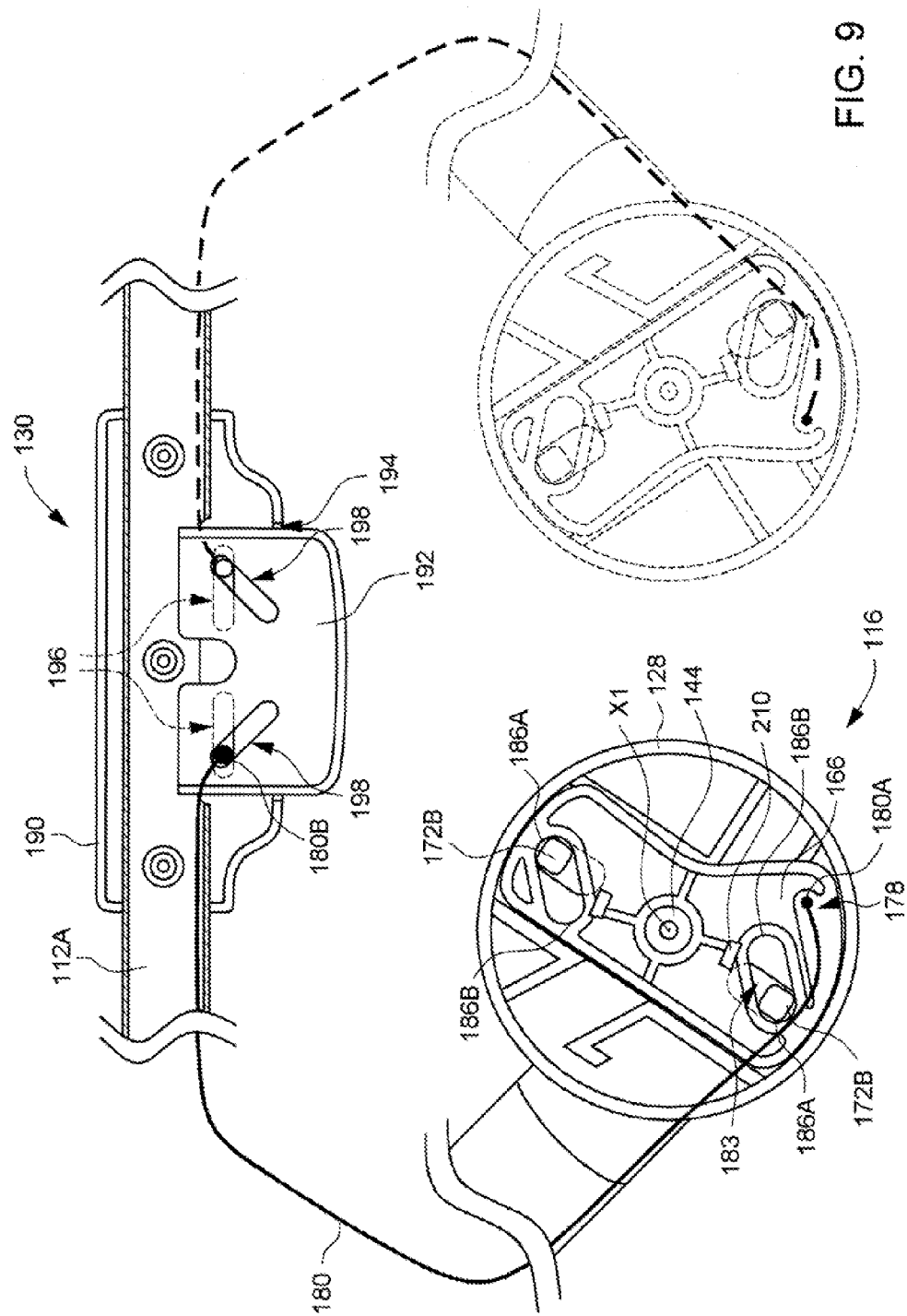
FIG. 9 is a schematic view illustrating a handle adjustment control symmetrically connected with each of the second lock mechanisms.

FIG. 9 is a schematic view illustrating the handle adjustment control 130 symmetrically connected with each of the second lock mechanisms 116. The transmission element 180, which can be exemplary a cable element, is assembled through an interior of the handle 112 (only the grasping portion 112A is shown in the figure). The transmission element 180 can have a first end 180A engaged with the anchor hole 178 of the rotary plate 166, and a second end 180B connected with the handle adjustment control 130.

The handle adjustment control 130 can be assembled with the grasping portion 112A, and include a housing 190 and a button 192. The housing 190 can include an opening 194 through which the button 192 can be movably mounted with the housing 190, and two spaced-apart guide slots 196 that can respectively overlap at least partially with two biasing slots 198 formed through a portion of the button 192.

The handle adjustment control 130 is respectively connected with the rotary plate 166 of each first lock mechanism 114 via the cable transmission element 180. In one embodiment, the first and second ends 180A and 180B can be respectively provided with pin elements, whereby the first end 180A of the transmission element 180 can be securely held at the anchor hole 178 of the rotary plate 166 (as shown in FIG. 5) and the second end 180B movably guided through the associated biasing slot 198 of the button 192 and guide slot 196 of the housing 190. A user can operate the handle adjustment control 130 to switch each of the first lock mechanisms 114 from a locked state to an unlocked state. In the first lock mechanism 114, the springs 182 (as shown in FIG. 8) can act to bias the latching bolts 172 away from the pivot axis for holding the locked state, whereas the button 192 extends outward through the opening 194 of the housing 190. In this configuration, the end portions 172B of the latching bolts 172 are respectively positioned adjacent to the first distal ends 186A of the guide slots 186.

Figure 10:
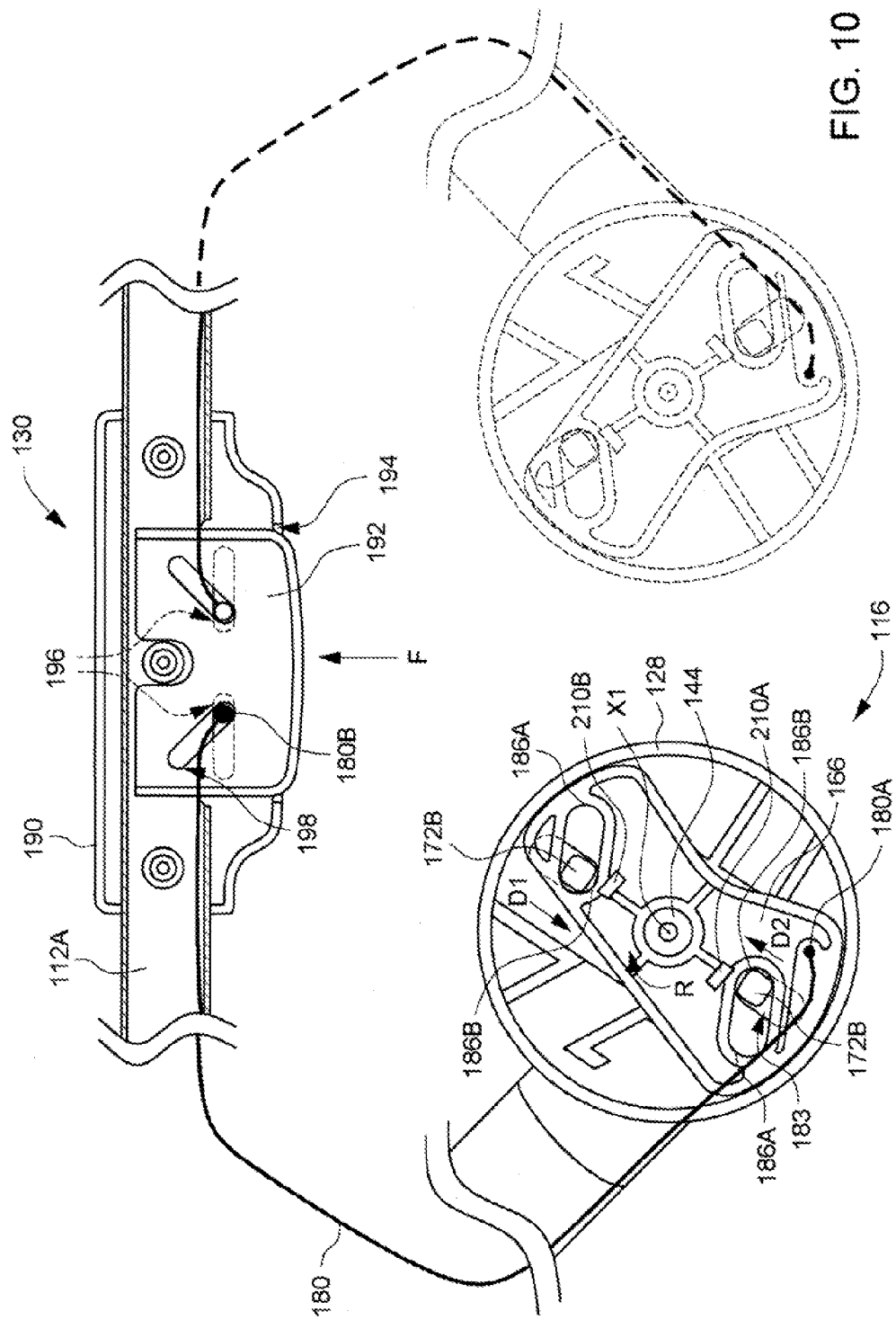
FIG. 10 is a schematic view illustrating the operation of the handle adjustment control and the second lock mechanisms.

FIG. 10 is a schematic view illustrating the operation of the handle adjustment control 130 and the second lock mechanisms 116. As the button 192 is pushed in the direction F, the combined action of the guide slots 196 and 198 overlapped with each other can drive the second end 180B of each transmission element 180 to slide along the guide slots 196 toward each other. Being pulled, the transmission elements 180 can accordingly cause the rotary plates 166 to rotate symmetrically on the left and right sides about the pivot axis X1 in the same direction R. As each rotary plate 166 rotates in the direction R, the sliding interaction between the guide slots 186 and the end portions 172B can urge the latching bolts 172 to slide toward the pivot axis X1 in opposite radial directions (as shown with arrows D1 and D2) to the unlocked state shown in FIG. 10. In this configuration, the end portions 172B of the latching bolts 172 are respectively positioned adjacent to the second distal ends 186B of the guide slots 186. Since the respective radial distance between each of the latching bolts 172 and the pivot axis X1 is shorter in the unlocked state than in the locked state, the springs 182 become compressed in the unlocked state. When the button 192 is released, the springs 182 can urge the latching bolts 172 to slide in opposite radial directions away from the pivot axis X1, which in turn causes the rotary plate 166 to rotate reversely for recovering the locked state of FIG. 9.

Figure 11:
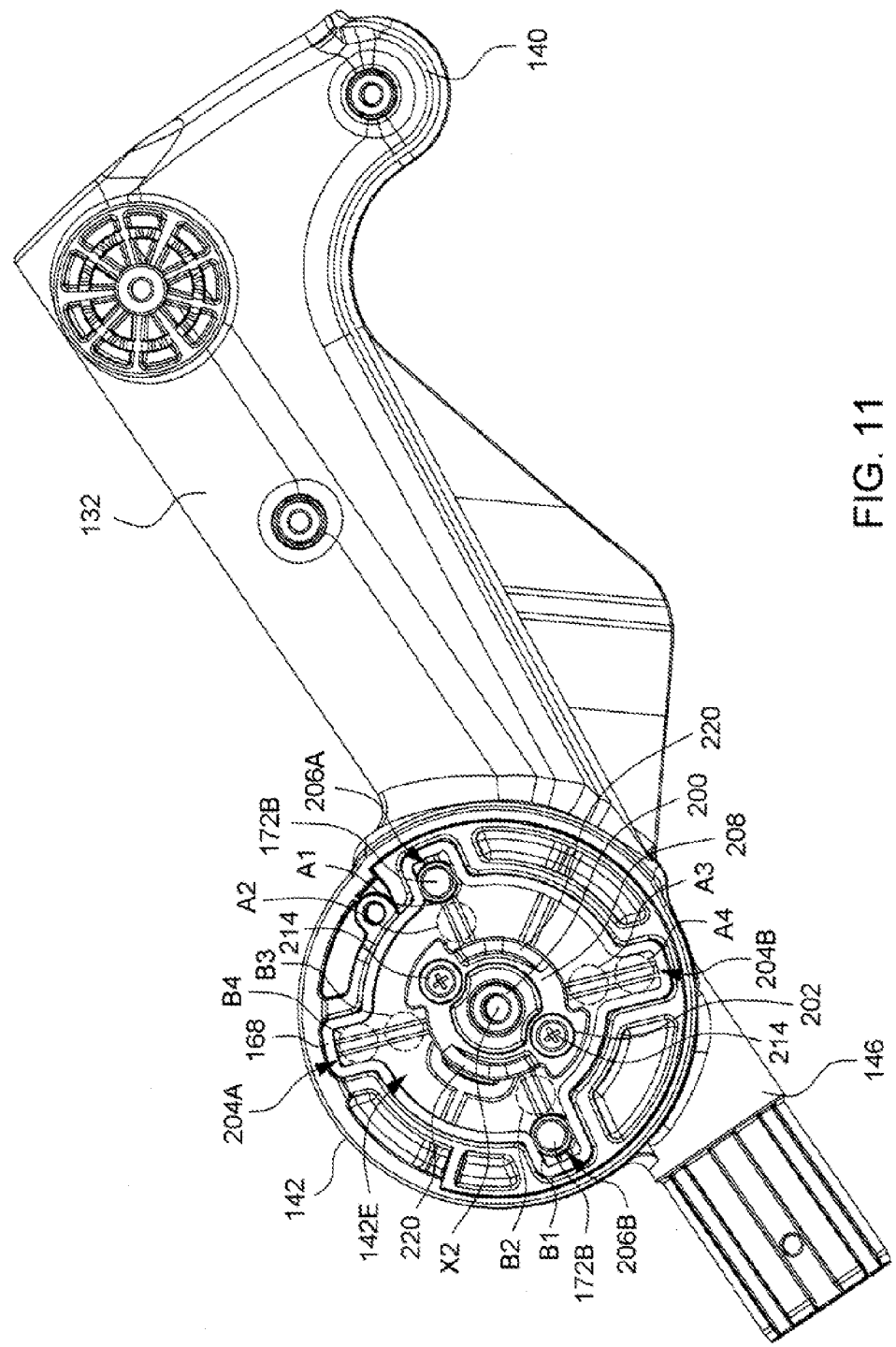
FIG. 11 is a schematic view illustrating different positions of the latch unit relative to the axle housing

FIG. 11 is a schematic view illustrating different positions of the latch unit 164 relative to the axle housing 142. The inner recessed region 142E of the axle housing 142 can include a central shaft portion 200 and two connecting posts (not shown), all of which are protruding from a bottom of the recessed region 142E generally parallel to the pivot axis X2. A boundary of the recessed region 142E can be delimited by a rigid cage 168. In the illustrated embodiment, the cage 168 can be formed by a metallic material, such as aluminum or stainless steel, and can define a surrounding wall of the recessed region 142E. The cage 168 includes multiple locking slots 204A, 204B, 206A and 206B disposed at different radial directions relative to the shaft portion 200. In particular, the locking slots 204A and 204B can be disposed diametrically opposite relative to the shaft portion 200 along a first diameter direction, whereas the locking slots 206A and 206B can be disposed diametrically opposite relative to the shaft portion 200 along a second diameter direction.

The end portions 172B of the latching bolts 172 respectively extend into the recessed region 142E, and can respectively shift to different locked positions A1, B1, A4 and B4 or unlocked positions A2, B2, A3 and B3 as the second lock mechanism 116 is operated and the handle 112 adjusted to different inclinations (e.g., toward the first side 100A or second side 100B). For example, when the handle 112 is in a position inclined toward the second side 100B (as shown in FIG. 1), the end portions 172B of the latching bolts 172 can respectively engage at the locking positions A4 and B4, whereby turning the second lock mechanism 116 to a locked state in which the handle 112 and the support frame 102 (in particular the first frame portion 106 of the support frame 102) are locked in place.

In case the handle adjustment control 130 is operated to turn the second lock mechanism 116 to an unlocked state, the rotary plate 166 can drive the end portions 172B of the latching bolts 172 respectively to the unlocked positions A3 and B3. Subsequently, the handle 112 can be adjusted to incline toward the first side 100A, as shown in FIG. 2. Once the handle 112 reaches the position of FIG. 2, the springs 182 can urge the latching bolts 172 in movement so that the end portions 172B are shifted to the locked positions A1 and B1 for locking the second lock mechanism 116. The handle 112 and the second support frame 102 (in particular the first frame portion 106) are thereby locked in place.

When the handle 112 is to be adjusted from the position shown in FIG. 2 to the position shown in FIG. 1, the handle adjustment control 130 can be operated to displace the end portions 172B of the latching bolts 172 to the unlocked positions A2 and B2, thereby switching the second lock mechanisms 116 to the unlocked state. Subsequently, the unlocked handle 112 can be rotated toward the second side 100B, as shown in FIG. 1. Once the handle 112 reaches the position shown in FIG. 1, the springs 182 can urge the latching bolts 172 in movement so that the end portions 172B can recover the locked positions A4 and B4 for locking the second lock mechanism 116.

Figure 12:
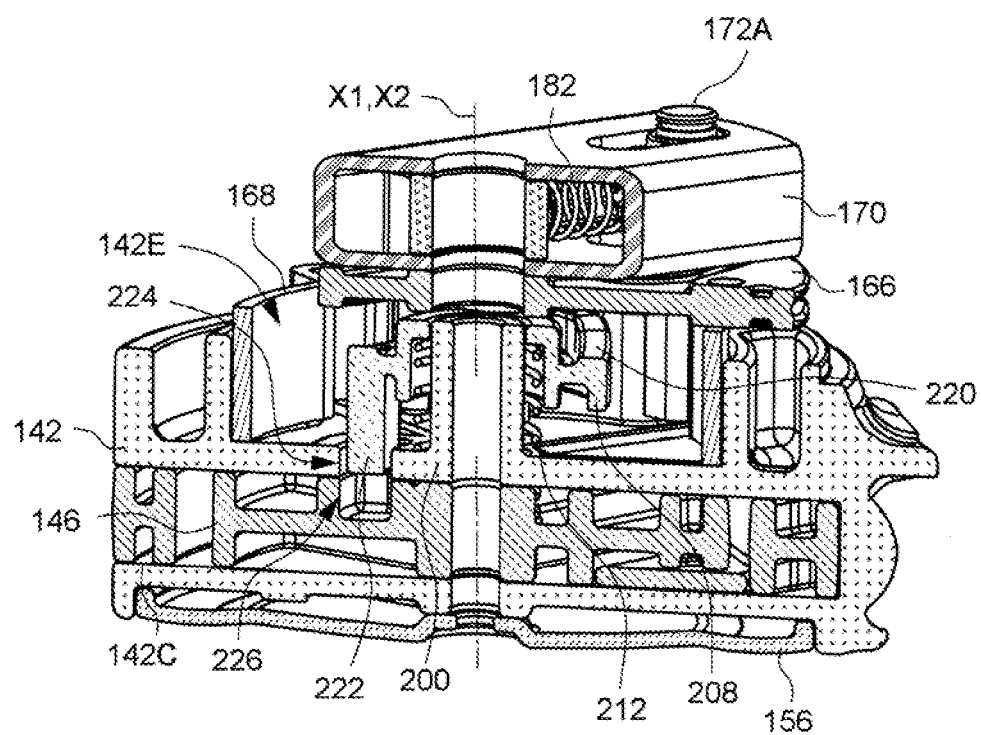
FIG. 12 is a cross-sectional view illustrating the construction of a safety lock.

In conjunction with FIGS. 4 and 11, FIG. 12 is a cross-sectional view illustrating the construction of the safety lock 118. The safety lock 118 can include a latching member 208 and a spring 212. The latching member 208 can have a generally circular outer contour, and include a central hole through which the shaft portion 200 is inserted for guiding translational movements of the latching member 208 along the shaft portion 200 and parallel to the pivot axis X2. In addition, two posts 202 protruding from the first surface 142A of the axle housing 142 at two opposite sides of the shaft portion 200 (shown in FIG. 4) can respectively pass through two corresponding holes 208A formed in the latching member 208. Screws 214 can also be engaged through the distal ends of the posts 202 to restrict the range of displacement of the latching member 208 in the axle housing 142 and prevents its disengaging from the shaft portion 200.

A first side of the latching member 208 opposite to that of the first surface 142A in the axle housing 142 can include two beveled surfaces 220 disposed at diametrically opposite locations relative to the pivot axis X2, whereas a second side of the latching member 208 facing the first surface 142A of the axle housing 142 can include a protruding arm 222 located eccentric from the pivot axis X2. As the handle 112 and the first coupling element 128 rotates toward the first side 100A, the beveled surfaces 220 can interact with corresponding protrusions 210 provided at a side of the first coupling element 128 for causing the latching member 208 to slide along the shaft portion 200 and parallel to the pivot axis X2, which consequently causes the arm 222 to engage through openings 224 and 226 respectively formed through the bottom of the recessed region 142E and the second coupling element 146.

In one embodiment, the protrusions 210 can be exemplary formed on the rotary plate 166 at two opposite sides of the central hole 184 (as shown in FIG. 7). However, in alternate embodiments, the protrusions 210 can also be formed at other locations of the first coupling element 128, allowing the protrusions 210 to be driven in rotation along with the first coupling element 128 and the handle 112. Moreover, while the illustrated embodiment shows two beveled surfaces 220 and two protrusions 210, the latching member 208 may also be driven in movement via the interaction between more or less beveled surfaces and protrusions.

Referring again to FIG. 12, the spring 212 can be wrapped around the shaft portion 200, and have a first end connected with the bottom surface of the recessed region 142E and a second end connected with the latching member 208.

As shown in FIG. 12, the second coupling element 146 when assembled with the axle housing 142 is at a position overlapping with the recessed region 142E. When the support frame 102 is deployed for use (i.e., the second frame portion 108 is unfolded relative to the first frame portion 106), the opening 224 formed through the bottom of the recessed region 142E can be aligned with the opening 226 formed through the second coupling element 146. As the second frame portion 108 is folded relative to the first frame portion 106, the openings 224 and 226 may become misaligned from each other.

When the handle 112 is in the position inclined toward the second side 100B of the infant carrier apparatus 100 (as shown in FIG. 1), the arm 222 of the latching member 208 is disengaged from the opening 226 of the second coupling element 146, and the safety lock 118 is in an unlocked state. In case the infant carrier apparatus 100 is to be collapsed, the folding control 122 can be operated to unlock the first lock mechanisms 114. Then, the first frame portion 106 and handle 112 can be rotated relative to the second frame portion 108 for collapsing the infant carrier apparatus 100 (as shown in FIG. 3).

Figure 13:
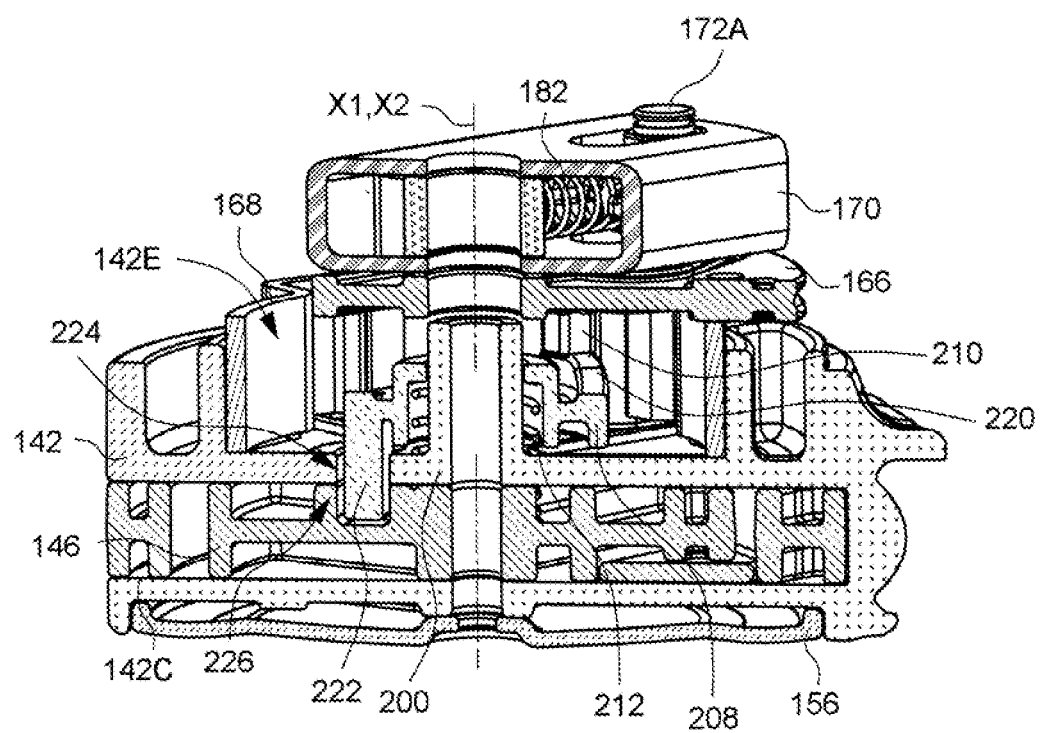
FIG. 13 is a cross-sectional view illustrating the safety lock in a locked state.

FIG. 13 is a cross-sectional view illustrating the safety lock 118 in a locked state. When the support frame 102 is deployed for use, the opening 224 can be aligned with the opening 226. As the handle 112 is adjustably rotated from the second side 100B toward the first side 100A, the protrusions 210 can respectively rotate and push against the beveled surfaces 220 of the latching member 208. As a result, the latching member 208 can move toward the bottom of the recessed region 142E and compress the spring 212. This displacement of the latching member 208 causes the arm 222 to engage with the aligned openings 224 and 226, turning the safety lock 118 to the locked state. In this configuration, even if a user operates the folding control 122 and unlocks the first lock mechanisms 114, the first frame portion 106 is still kept rotationally locked in place with the second frame portion 108 via the safety lock 118. The infant carrier apparatus 100 is therefore blocked in the deployed state and cannot be collapsed.

When the handle 112 is rotated from the first side 100A to the second side 100B, the spring 212 can urge the latching member 208 to move away from the bottom of the recessed region 142E, such that the arm 222 can disengage from the second coupling element 146. Accordingly, the safety lock 118 can be turned to the unlocked state only when the handle 112 is in the position inclined toward the second side 100B.

With the safety lock described herein, the support frame can be blocked in the deployed state when the handle is used at a certain inclined position that can interfere with the folding of the support frame. Accordingly, erroneous or accidental operation which may lead to incomplete collapse of the support frame can be prevented, and the infant carrier apparatus can be safer in use.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant carrier apparatus comprising:
a support frame having opposite first and second sides, wherein the support frame includes a first frame portion having a coupling bracket, and a second frame portion having a coupling element pivotally coupled with the coupling bracket, the coupling bracket and the coupling element respectively including a first and a second opening, the second frame portion being operable to rotate relative to the first frame portion between a collapsed state and a deployed state;
a handle pivotally coupled with the support frame, wherein the handle is operable to rotate relative to the support frame between a first position inclined toward the second side, and a second position inclined toward the first side; and
a safety lock assembled between the handle and the first frame portion, the safety lock being unlocked to allow rotation of the first frame portion relative to the second frame portion when the handle is in the first position, and the safety lock being turned to a locked state to lock the first frame portion with the second frame portion and block relative rotation there between when the handle is rotated to the second position;
wherein the safety lock includes a latching member that is assembled at a side of the coupling bracket opposing the coupling element and is movable to a position in locking engagement with the first and second frame portion when the handle rotates to the second position, the latching member engaging through the first and second openings when the handle is rotated to the second position, and the latching member disengaging from the second opening when the handle is rotated to the first position.

2. The apparatus according to claim 1, further comprising a seat portion assembled with the support frame.

3. The apparatus according to claim 1, wherein the safety lock further comprises a spring, the spring being operable to urge the latching member to disengage from the second frame portion when the handle is rotated to the first position.

4. The apparatus according to claim 1, wherein the support frame further comprises a third frame portion pivotally connected with the first frame portion, the second and third frame portions respectively have lower ends provided with wheels.

5. The apparatus according to claim 1, further including a lock mechanism operable to lock the handle at either of the first and second position, wherein the coupling bracket has an inner surface that includes a plurality of locking slots arranged at different radial directions relative to the pivot axis, and a shaft portion projecting along the pivot axis along which the latching member is movable, the lock mechanism being in locking engagement with a different one of the locking slots when the handle is at the first or second position.

6. The apparatus according to claim 5, wherein the lock mechanism includes a movable plate at a side of which is formed a protrusion adapted to push the latching member in movement when the handle rotates to the second position.

7. An infant carrier apparatus comprising:
a support frame having opposite first and second sides, wherein the support frame includes a first frame portion, and a second frame portion pivotally coupled with the first frame portion, the second frame portion being operable to rotate relative to the first frame portion between a collapsed state and a deployed state;
a handle pivotally coupled with the support frame, wherein the handle is operable to rotate relative to the support frame between a first position inclined toward the second side, and a second position inclined toward the first side;
a coupling bracket affixed with the first frame portion;
a first and a second coupling element respectively affixed with the handle and the second frame portion, wherein the first and second coupling elements are pivotally connected with the coupling bracket about a same pivot axis, the handle and the second frame portion being operable to rotate relative to the first frame portion about the pivot axis; and
a safety lock assembled between the handle and the first frame portion, wherein the safety lock is triggered by a rotational movement of the handle to rotationally lock the first frame portion with the second frame portion, the safety lock being unlocked to allow rotation of the first frame portion relative to the second frame portion when the handle is in the first position, and the safety lock being turned to a locked state to lock the first frame portion with the second frame portion and block relative rotation there between as the handle is rotated to the second position;
wherein the safety lock includes a latching member that is assembled between the coupling bracket and the first coupling element, and the first coupling element includes a protrusion that is adapted to push the latching member in movement when the handle rotates to the second position, thereby urging the latching member to lock the coupling bracket with the second coupling element.

8. The apparatus according to claim 7, wherein the safety lock further comprises a spring adapted to urge the latching member to disengage from the second coupling element as the handle rotates to the first position.

9. The apparatus according to claim 7, further comprising a first lock mechanism provided between the coupling bracket and the second coupling element, wherein the first lock mechanism when in an unlocked state allows the second frame portion to rotate relative to the first frame portion to collapse the support frame, and the first lock mechanism when in a locked state is adapted to lock the first and second frame portions in the deployed state.

10. The apparatus according to claim 7, further comprising a second lock mechanism provided between the coupling bracket and the first coupling element, wherein the second lock mechanism when in an unlocked state allows the handle to rotate between the first and second position, and the second lock mechanism when in a locked state is adapted to lock the handle at either of the first and second position.

11. The apparatus according to claim 7, further including a lock mechanism operable to lock the handle at either of the first and second position, wherein the coupling bracket has an inner surface that includes a plurality of locking slots arranged at different radial directions relative to the pivot axis, and a shaft portion projecting along the pivot axis along which the latching member is movable, the lock mechanism being in locking engagement with a different one of the locking slots when the handle is at the first or second position.

12. The apparatus according to claim 11, wherein the lock mechanism includes a movable plate at a side of which is formed the protrusion adapted to push the latching member in movement when the handle rotates to the second position.

13. An infant carrier apparatus comprising:
a support frame having opposite first and second sides, wherein the support frame includes a first frame portion, and a second frame portion pivotally coupled with the first frame portion, the second frame portion being operable to rotate relative to the first frame portion between a collapsed state and a deployed state;

a handle pivotally coupled with the support frame, wherein the handle is operable to rotate relative to the support frame between a first position inclined toward the second side, and a second position inclined toward the first side;

a coupling bracket affixed with the first frame portion;

a first and a second coupling element respectively affixed with the handle and the second frame portion, wherein the first and second coupling elements are pivotally connected with the coupling bracket about a same pivot axis, the handle and the second frame portion being operable to rotate relative to the first frame portion about the pivot axis;

a safety lock assembled between the handle and the first frame portion, wherein the safety lock is triggered by a rotational movement of the handle to rotationally lock the first frame portion with the second frame portion, the safety lock being unlocked to allow rotation of the first frame portion relative to the second frame portion when the handle is in the first position, and the safety lock being turned to a locked state to lock the first frame portion with the second frame portion and block relative rotation there between as the handle is rotated to the second position; and a lock mechanism provided between the coupling bracket and the first coupling element, wherein the lock mechanism when in an unlocked state allows the handle to rotate between the first and second position, and the lock mechanism when in a locked state is adapted to lock the handle at either of the first and second position;

wherein the safety lock includes a latching member assembled between the coupling bracket and the first coupling element, and the lock mechanism includes at least one protrusion at a side facing the latching member, the protrusion being adapted to push the latching member in movement when the handle rotates to the second position, thereby urging the latching member to rotationally lock the coupling bracket with the second coupling element.

14. The apparatus according to claim 13, wherein the latching member is movable along a direction substantially parallel to the pivot axis.

15. The apparatus according to claim 13, wherein an inner surface of the coupling bracket facing the first coupling element includes a plurality of locking slots arranged at different radial directions relative to the pivot axis, and a shaft portion projecting along the pivot axis along which the latching member is movably mounted, wherein the lock mechanism is in locking engagement with a different one of the locking slots when the handle is at the first or second position.

16. The apparatus according to claim 15, wherein the coupling bracket includes two posts that disposed eccentric from the shaft portion and pass through two corresponding holes of the latching member.

17. The apparatus according to claim 16, wherein two screws are respectively engaged with distal ends of the posts to limit a range of movement of the latching member along the shaft portion.

18. The apparatus according to claim 13, wherein the lock mechanism includes a rotary plate at a side of which is formed the protrusion.

19. The apparatus according to claim 13, further comprising an additional lock mechanism provided between the first frame portion and the second frame portion, wherein the additional lock mechanism when in an unlocked state allows the second frame portion to rotate relative to the first frame portion to collapse the support frame, and the additional lock mechanism when in a locked state is adapted to lock the first and second frame portion in the deployed state.

* * * * *